United States Patent [19]
Bishop

[11] 3,756,551
[45] Sept. 4, 1973

[54] ANTI-VIBRATION SUPPORT
[75] Inventor: Lester A. Bishop, Fairview, Pa.
[73] Assignee: Lord Corporation, Erie, Pa.
[22] Filed: Oct. 27, 1971
[21] Appl. No.: 192,962

[52] U.S. Cl............... 248/358 R, 248/22, 267/153, 248/9
[51] Int. Cl........................................... B60g 11/18
[58] Field of Search...................... 248/358 R, 9, 10, 248/15, 22, 24; 287/85 P; 267/153; 180/64 R

[56] References Cited
UNITED STATES PATENTS
3,552,785  1/1971  Elder et al. ..................... 248/358 R
2,241,138  5/1941  Julien................................ 287/85 R FOREIGN PATENTS OR APPLICATIONS
776,990  6/1957  Great Britain........................ 248/15
971,650  1/1951  France............................... 287/85 R Primary Examiner—J. Franklin Foss
Attorney—James W. Wright

[57] ABSTRACT

Spaced supported and supporting members having axially aligned apertures are isolated by a pair of resilient mountings. The resilient mounting are substantially identical and are disposed on opposite sides of one of the members in alignment with the apertures therein. Conventional nut and bolt means are used to interconnect the mountings and supported and supporting members with the mountings acting in compression in multi-directions to provide vibration isolation. Due to the unique design of the mountings, there are no localized areas of stress and strain concentration arising adjacent the apertures, the mountings are easy to install and the spring rates can be substantially independently controlled axially and radially of the mountings.

7 Claims, 3 Drawing Figures

PATENTED SEP 4 1973 3,756,551

ANTI-VIBRATION SUPPORT

This invention relates to an anti-vibration support for providing vibration isolation between a supported and supporting structure and more particularly to resilient mountings for use therein.

BACKGROUND

In vibration isolation of a supported structure relative to a supporting structure, it is usually necessary to provide isolation in multi-directions. Where relatively heavy structures are to be isolated, it is necessary to use resilient mountings having a good static load carrying ability and being relatively stiff in all directions. Typically, such resilient mountings are formed from an elastomeric material with the material being loaded in compression in the various directions in which isolation is desired. However, where a single elastomeric mounting must isolate in mutually perpendicular directions, while a portion of the elastomer is being loaded in compression another portion is typically being stressed in shear. As a result very high stresses and strains are established in localized areas of the elastomer which leads to its early fatigue. A typical prior art elastomeric compression mounting of the foregoing type is described in Beck, et al. U. S. Pat. No. 2,828,095, assigned to the assignee of the present invention. In addition, in such prior art elastomeric compression mountings, the axial and radial spring rates are highly dependent on each other and thus, minimizes the versatility of vibration isolation in various directions.

SUMMARY OF THE INVENTION

With the above in mind, it is an object of the present invention to provide an anti-vibration support utilizing an improved elastomeric mounting which acts in compression and eliminates localized areas of high stress and strain concentration in the elastomer.

Another object of the present invention is to provide an anti-vibration support utilizing an elastomeric mounting wherein the spring rates in mutually perpendicular directions can be substantially independently controlled.

A still further object of the present invention is to provide an anti-vibration support utilizing an elastomeric mounting which is economical and easy to install.

Briefly, the objects of the present invention are accomplished by a resilient mounting comprising an elongate tubular elastomeric body having an elongate annular recess concentrically disposed therein and extending substantially axially thereof from and in open communication with one end. A rigid tubular spacer sleeve is concentrically secured, preferably bonded, within and to the body and extends coextensive therewith. In an unloaded condition, the portion of the body radially inward of the recess has a length greater than the length of the portion radially outward of the recess. This difference in length facilitates proper installation of the mounting. In the preferred form, to be hereinafter described, the spacer sleeve has a radially outward flange bonded to the end of the body remote from the end having the recess communicating therewith.

To provide vibration isolation between spaced apart supported and supporting members, a mounting of the above description is disposed on opposite sides of the supporting member with one of said mountings between the members. The ends of the elastomeric bodies having the recesses communicating therewith face each other and the supporting member with the portions inwardly of the recesses aligned with aligned apertures in the supported and supporting members. A bolt is disposed through the aligned apertures in the supported and supporting members and the spacer sleeves. Securing means, preferably a nut, is operatively associated with the bolt for axially precompressing the portions of the bodies outwardly of the recesses and for forcing the portions of the bodies inwardly of the recesses inwardly of the supporting member aperture. The precompressed portions or portions outwardly of the recesses provide axial isolation and the portions received in the supporting member aperture or inwardly of the recess provide isolation radially. Due to the recess, no localized stresses and strains are established in the elastomeric body and the spring rates axially and radially may be substantially independently controlled.

BRIEF DESCRIPTION OF DRAWINGS

Some of the objects of the invention have been stated, other objects will appear as the description proceeds, when taken in connection with the accompanying drawings, in which.

DETAIL DESCRIPTION OF DRAWINGS

Figure 1:
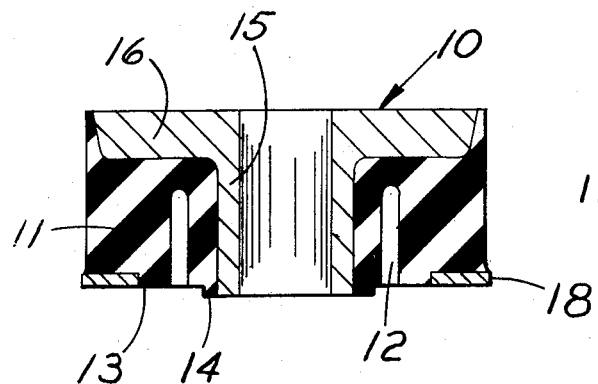
FIG. 1 is a sectional view of a resilient mounting of the present invention.

With reference now to the various figures wherein like reference characters are employed to indicate like parts, there is shown in FIG. 1 a resilient mounting, generally indicated at 10, of the present invention.

As illustrated, the resilient mounting 10 comprises an elongate, preferably cylindrical, tubular body 11 of elastomer such as natural or synthetic rubber. The tubular elastomeric body 11 has an elongate annular recess 12 concentrically disposed therein and extending axially thereof from and in open communication with one end thereof. The recess 12 preferably has substantially cylindrical side walls. The radial location and length of the recess 12 will be primarily determined by the performance and installation requirements of the mounting 10. However, more will be said later about the radial location and length of the recess 12 when discussing the installation and operation of the mounting 10.

The recess 12 divides the tubular body 11 into a radially outward portion 13 and a radially inward portion 14. The length of the radially inward portion 14 is preferably greater then the length of the radially outward portion 13 with the difference in length being provided at the end of the tubular body 11 having the recess 12 communicating therewith. Preferably, as shown, the portion of the radially inward portion 14 which projects axially beyond the radially outward portion 13 has a reduced diameter, the importance of which will hereinafter become apparent.

A rigid tubular spacer sleeve 15 of non-flexible material such as metal, plastic or the like is concentrically disposed within the tubular body 11 and extends coextensively with the radially inward portion 14. The spacer sleeve 15 preferably has an outer diameter substantially equivalent to the inside diameter of the tubular body 11 and is adhered, preferably by bonding, within and to the tubular body 11 to provide structural continuity. Rather than bonding, it will be apparent that an interference fit between the spacer 15 and body 11 may be provided or some other similar securing means may be employed. While it is preferred that the sleeve 15 be secured within the tubular body 11 prior to actual use of the resilient mounting 10, the securing may be accomplished as a result of installation of the resilient mounting 10. The spacer sleeve 15 also preferably has a radial flange 16 adhered, preferably bonded, in engagement with the end of the body 11 remote from the end having the recess 12 communicating therewith. The flange 16, as shown, extends radially outward beyond the recess 12 into overlapping relation with the radial outward portion 13.

A rigid annular plate 18, having an inside diameter at least equal to the outside diameter of the recess 12 is embedded in and bonded to the end of the radially outward portion 13 of the tubular body 11. The outer diameter of the annular plate 18 should not be any greater than the outside diameter of the tubular body 11.

Figure 2:
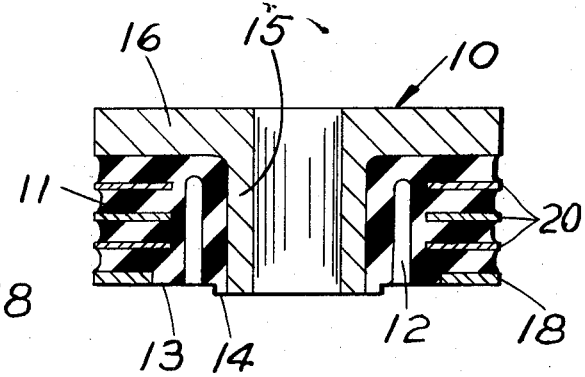
FIG. 2 is a sectional view similar to that of FIG. 1 of a modified resilient mounting of the present invention.

With reference to FIG. 2, there is shown a resilient mounting 10 identical to that of FIG. 1 except for the addition of a plurality of spaced rigid annular plates 20 substantially identical to plate 18 embedded in and bonded to the radially outward portion 13 of the tubular body 11. These plates 18 and 20 increase the axial stability of the radially outward portion 13 and, more importantly, increase the compressive load carrying capacity of the radially outward portion 13. Similar plates could be embedded in and bonded to the radially inward portion 14 of the tubular body 11. However, such plates should extend axially rather than radially to increase the radial load carrying capacity of the radially inward portion 14.

Figure 3:
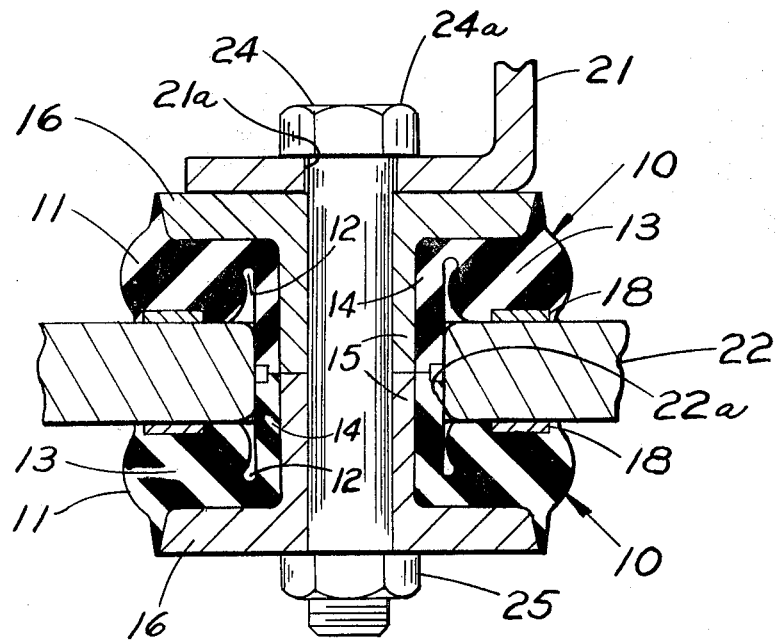
FIG. 3 is a detail sectional view illustrating an anti-vibration support utilizing the resilient mounting of FIG. 1 to isolate a supported member from a supporting member.

In FIG. 3 there is shown an anti-vibration support utilizing the resilient mountings 10 of FIG. 1 in isolating a supported member 21 spaced from a supporting member 22. The terms "supported∞ and "supporting" are used merely for ease of describing the present invention, and a reversal of these elements is contemplated within the scope of the invention. The spaced supported and supporting members 21 and 22 have aligned aperatures 21a and 22a, respectively.

A pair of nearly identical resilient mountings 10 are provided having the inner diameter of recess 12 substantially equal to the diameter of aperture 22a in the supporting member 22. The mountings 10 are disposed on opposite sides of the supporting member 22 with one of the mountings 10 being disposed between the supported and supporting members 21 and 22. The ends of the bodies 11 having the recesses 12 communicating therewith face each other and the supporting member 22. The radially inward portions 14 of the bodies 11 are aligned with and partially received in the aperture 22a of the supporting member 22 in an unloaded or uncompressed condition. This alignment is facilitated by the difference in length of the radially outward and inward portions 13 and 14 of the body 11 and the reduced diameter of the end of the radially inward portions 14 previously discussed.

A bolt 24 is mounted through the aligned apertures 21a and 22a and the spacer sleeves 15 with the head 24a resting on the supported member 21. Securing means in the form of nut 25 is threadedly mounted on the end of the bolt 24 remote from the head 24a. Upon tightening the nut 25 on the bolt 24, the supported and supporting members 21 and 22 are pulled together to axially precompress the radially outward portions 13 of the bodies 11 equally and to force the radially inward portions 14 of the bodies inwardly of the aperture 22a of and in engagement with supporting member 21 until the spacer sleeves 15 are abutting each other.

Precompression of the radially outward portion 13 is desired such that structural continuity is maintained between the supported and supporting members 21 and 22 during vibration isolation and to insure rebound snubbing. The length of the recess 12 should be such that after installation, FIG. 3, a portion of the recess 12 remains between the radially outward and inward portions 13 and 14 to define cavities on opposite sides of the supporting member 22 adjacent apertures 22a. This is accomplished by having the length of the recess 12 greater than or equal to the amount that each mounting 10 is to be precompressed. The radial flanges 16 of the sleeves 15 and plates 18 insure uniform axial compression loading of the radially outward portions 13 and the flanges 16 also provide a rigid surface against which the nut 25 may be tightened and thus, eliminates the need for a washer plate or the like.

For the installation shown in FIG. 3, the weight of the supported structure will be carried primarily by compression loading of the radially outward portion 13 of the upper mounting 10. Axial vibration will be isolated primarily by the radially outward portions 13 being deflected in compression and radial vibration will be isolated primarily by the radially inward portions 14 being deflected in compression. The recesses 12 have eliminated the presence of elastomer adjacent the edges of aperture 22a which interconnect the radially outward and inward portions 13 and 14. As a result, there remains no areas of localized stresses and strain which will lead to early fatigue of the mounting 10. Also, the axial and radial spring rates for the mountings may be more readily controlled.

In the drawings and specification, there has been set forth several preferred embodiments of the invention and, although specific terms are employed, they are used in a generic and descriptive sense only and not for purposes of limitation.

What is claimed is:
1. An anti-vibration support comprising,
   spaced supported and supporting members having axially aligned apertures,
   a pair of substantially identical elongate tubular elastomeric bodies, each of said bodies having an elongate annular recess concentrically disposed therein and extending axially thereof from and in open communication with one end, the inner diameter of said annular recess being substantially equal to the diameter of the aperture in one of said members,
   a rigid tubular spacer sleeve concentrically secured within and to each of said bodies and extending substantially coextensively therewith,
   said pair of bodies being disposed on opposite sides of said one member with one of said bodies being disposed between said supported and supporting members, the ends of said bodies having said reces- ses communicating therewith facing each other and said one member and having the portions inwardly of said recess aligned with the aperture of said one member aperture, a bolt extending through said aligned apertures in said supported and supporting members and said spacer sleeves, and securing means associated with said bolt for axially precompressing the portions of said bodies outwardly of said recesses and for forcing the portions of said bodies inwardly of said recesses inwardly of the aperture of and in engagement with said one member, said elastomeric bodies in conjunction with said one member defining annular cavities on opposite sides of said one member adjacent the aperture therein.

2. An anti-vibration support, according to claim 1, wherein the length of said recesses is at least equal to the amount that the radially outward portions of said elastomer bodies are to be precompressed.

3. An anti-vibration support, according to claim 1, wherein the length of said elastomer bodies radially outward of said recesses is less than the length of said bodies radially inward of said recesses with at least a portion of the difference in length being provided at the end of said bodies having the recesses communicating therewith.

4. An anti-vibration support, according to claim 1, wherein said spacer sleeves have an outer diameter substantially equivalent to the inside diameter of said bodies and are bonded to said bodies.

5. An anti-vibration support, according to claim 1, wherein said spacer sleeves have a radially outward flange at the end remote from the end having the recess communicating therewith extending in overlapping engaging relation to the portion of said body radially outward of said recess.

6. An anti-vibration support, according to Claim 1, including at least one annular rigid plate embedded in and bonded to the portion of said bodies radially outward of said recesses concentrically of said sleeves.

7. An anti-vibration support comprising, spaced supported and supporting members having aligned apertures, a pair of substantially identical elongate tubular elastomeric bodies, each of said bodies having an elongate annular recess concentrically disposed therein and extending axially thereof from and in open communication with one end, the inner diameter of said annular recess being substantially equal to the diameter of the aperture in one of said members, the length of said bodies radially outward of said recesses being less than the length of said bodies radially inward of said recesses and the difference in length being provided at the end of said bodies having the recesses communicating therefrom, a tubular spacer sleeve of non-flexible material having an outer diameter substantially equivalent to the inside diameter of said bodies concentrically disposed within and adhered to each of said bodies and extending coextensively therewith, said spacer sleeves having a radially outward flange at the end of said bodies remote from the end having the recess communicating therewith extending in overlapping engaging relation to the portion of said bodies radially outward of said recesses and adhered in engagement with the ends of said bodies, said pair of bodies being disposed on opposite sides of said one member with one of said bodies being disposed between said supported and supporting members, the ends of said bodies having said recesses communicating therewith facing each other and said one member and having the portions inwardly of said recess aligned with and partially received in the aperture of said one member, a bolt extending through said aligned aperture in said supported and supporting members and spacer sleeves, and nut means threadedly mounted on said bolt for axially precompressing the portions of said bodies outwardly of said recesses and for forcing the portions of said bodies inwardly of said recesses inwardly of the aperture of and in engagement with said one member with said spacer sleeves abutting each other, the length of said recesses being at least equal to the amount that the radially outward portions of said bodies are to be precompressed, said elastomeric bodies in conjunction with said one member defining annular cavities opposite sides of said one member adjacent the aperture therein.

* * * * *